Patented June 30, 1942

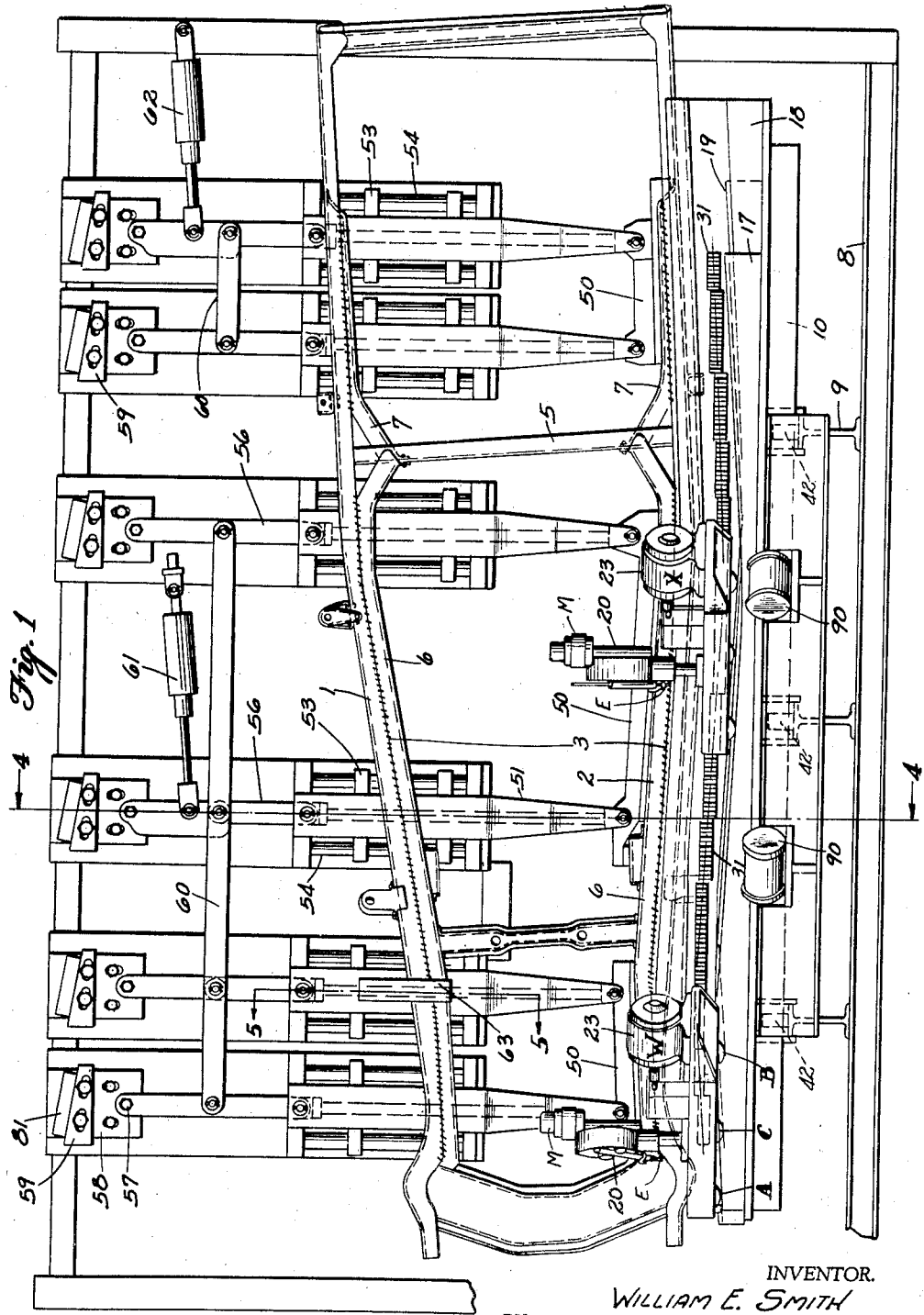

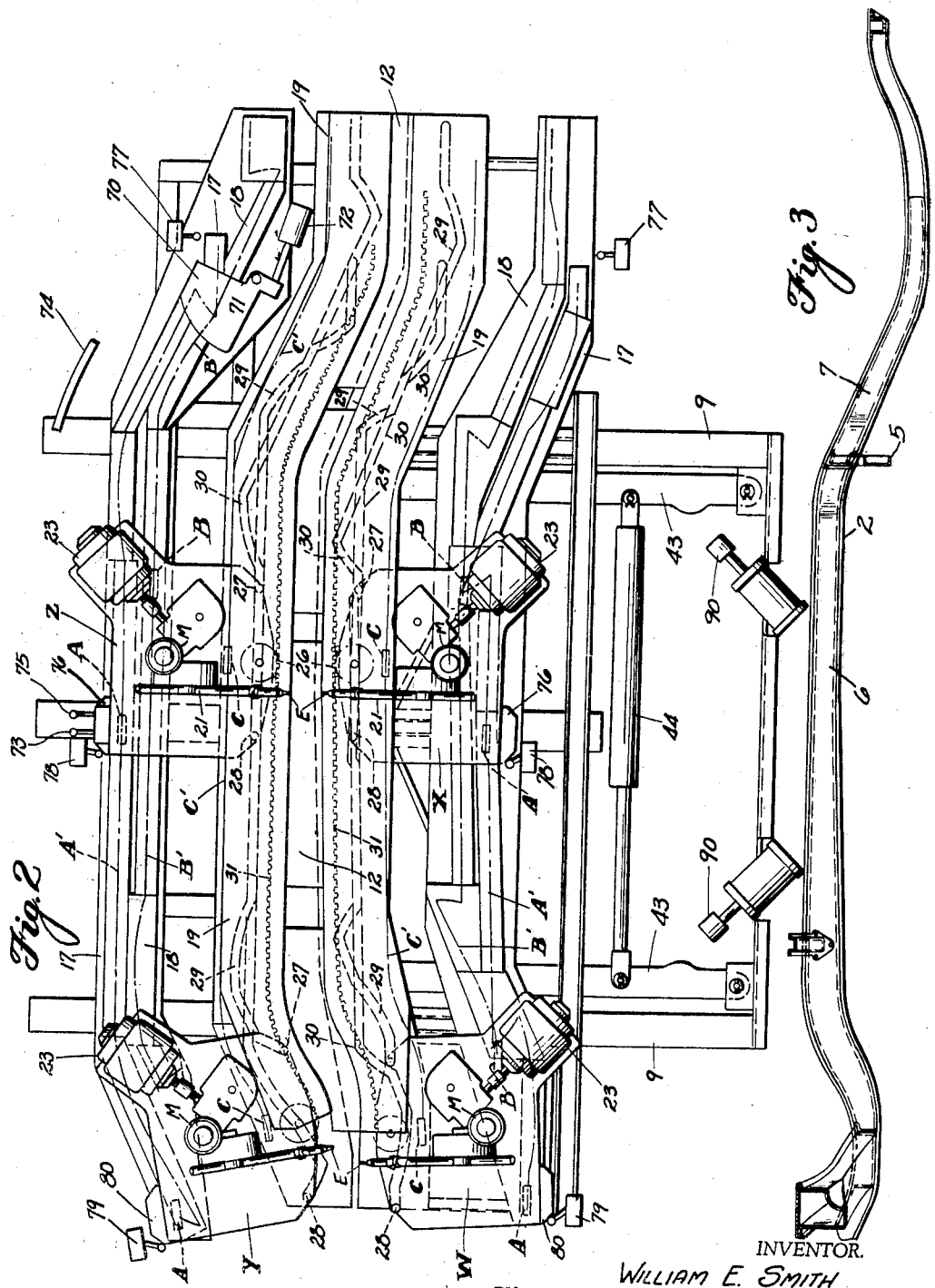

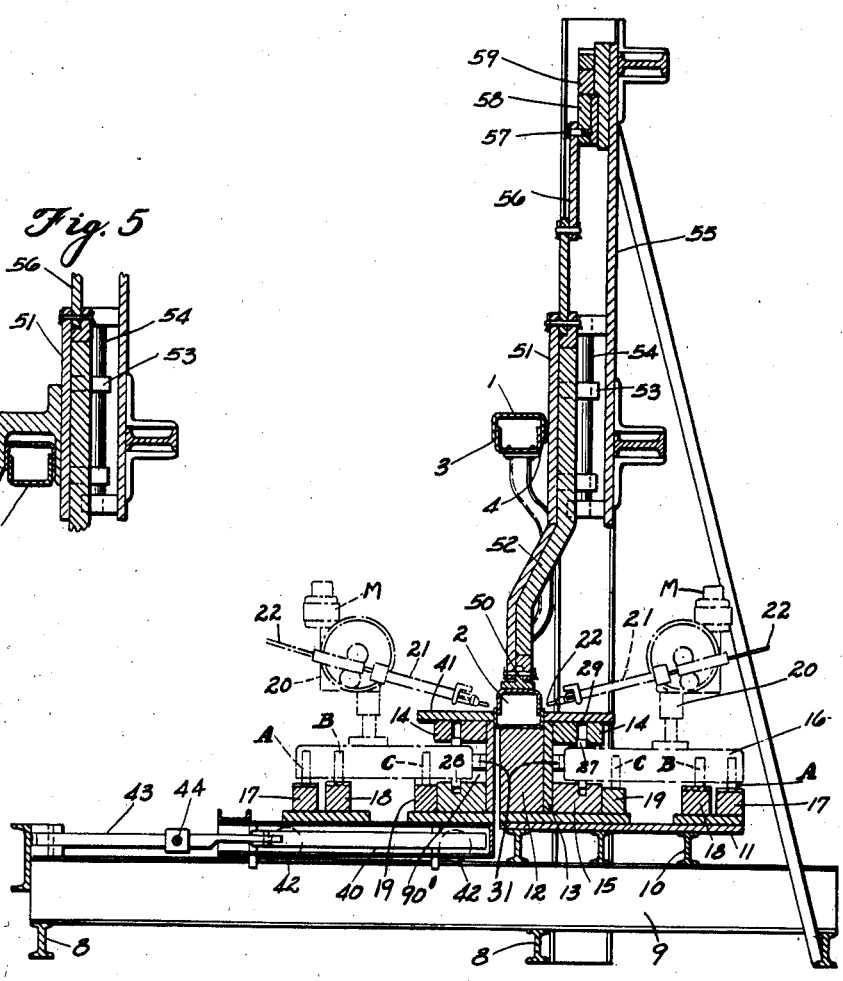

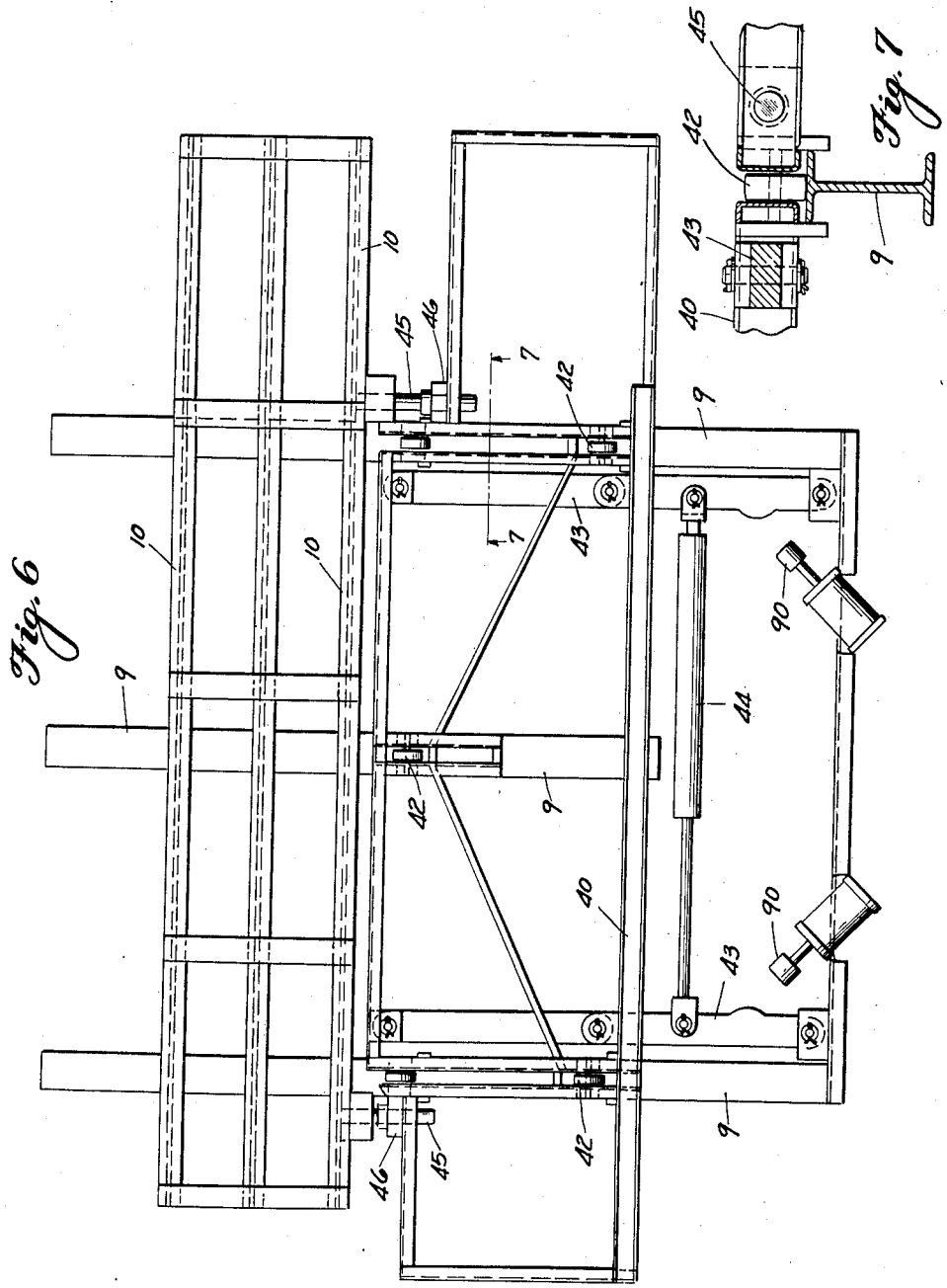

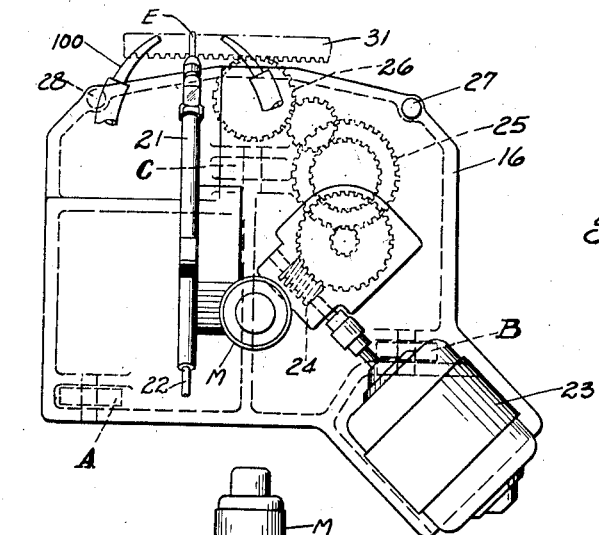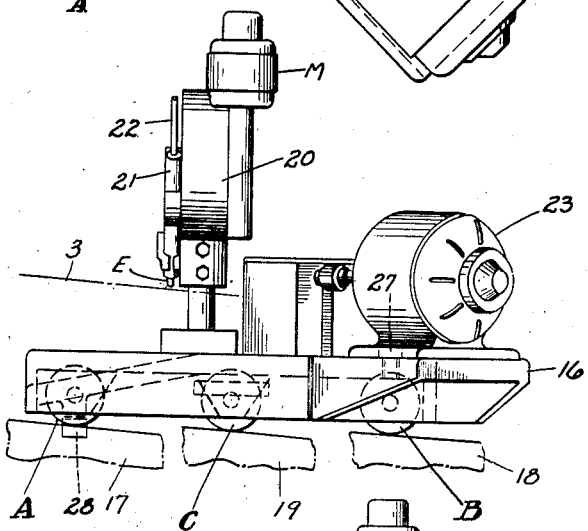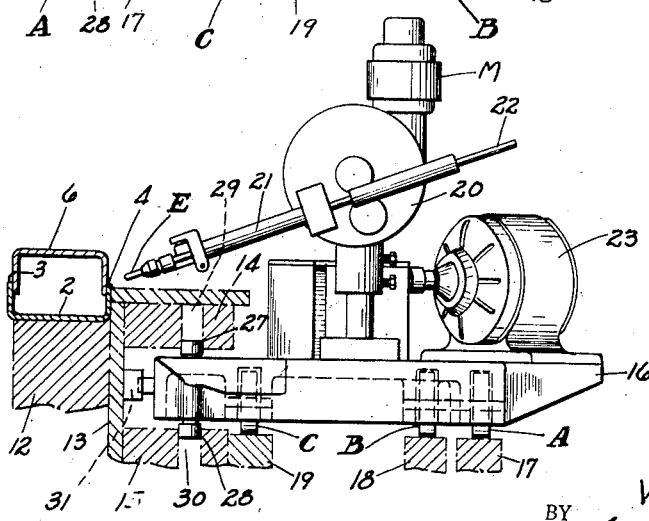

2,288,032

UNITED STATES PATENT OFFICE 2,288,032

AUTOMATIC WELDING APPARATUS

William E. Smith, Detroit, Mich., assignor to The Midland Steel Products Company, Cleveland, Ohio, a corporation of Ohio Application December 17, 1940, Serial No. 370,498

10 Claims. (Cl. 219—8)

This invention relates to new and useful improvements in automatic welding apparatus and an important object of the invention is to provide one which will rapidly weld two irregularly curved seams lengthwise of an elongated product, such as an automobile frame.

These products usually have a pair of longitudinal side rails having offset or kickup portions at opposite ends and which are not straight throughout their length, but bow outwardly and have other curves and bends at various portions of their length, so that another very important object is to provide welding mechanism which will have a component of movement which is the result of movements in three planes, namely, first, that of horizontal propulsion lengthwise of the frame; secondly, that which is vertical to follow the bow of the frame, and thirdly, that which is horizontal at right angles to the propulsion movement to follow the kickups; thereby tracing a line which is parallel to the axial line through a side rail of the frame.

A further object is to provide such mechanism as is capable of moving in opposite directions to perform its work, namely, from rear to front of one frame, and then from front to rear on the next frame, thus obviating resetting of the machine each time another frame is presented to the apparatus and saving time in a production line.

Another important object of the invention is to provide a pair of welding heads, simultaneously movable in the same direction, each to weld substantially one-half of the required length of a single lengthwise seam; one of such heads being provided with controls causing it to skip, or eliminate the welding of a predetermined portion of the seam; it being understood that the welding heads may be caused to weld a continuous uninterrupted seam, or one composed of a line of welds separated at predetermined intervals.

A still further object of the invention is to provide mechanism which will maintain a uniform spacing of the welding electrodes from the irregularly contoured work to effect uniform arc operation at unparalleled speeds.

Another object is to provide means for rigidly clamping one hollow side rail of the frame on its side with the other rail extending vertically, and bracing or supporting such other rail to prevent twisting of the frame and mis-alignment of its component parts.

Another object is to provide switches to stop operation of the welding heads at the limits of their movement as well as to cut the heads in and out to skip weld, and to provide connections between the heads whereby all will be stopped upon accidental extinguishment of the arc of any one head.

Another object is to provide a foundation frame having a stationary right angular work engaging portion, upon which frame is mounted a movable work engaging portion to serve in clamping the work against said stationary portion, and such clamping portions having their undersides provided with guides for the welding heads protected against the deposit of flash and splatter from the welding operation.

Other objects and advantages of the invention will become apparent during the course of the following description.

In the accompanying drawings forming a part of the description and wherein like numerals are employed to designate like parts throughout the several views, Fig. 1 is a side elevation of the apparatus with an automobile frame clamped in operative position therein.

Fig. 2 is a top plan of the base portion of the apparatus,

Fig. 3 is a top plan of a side rail showing its relative position in the apparatus ready for the welding operation, Fig. 4 is a transverse vertical section taken on the line 4—4 of Fig. 1, Fig. 5 is a section of a portion of the clamping mechanism for engaging the uppermost side rail of the frame in the apparatus, Fig. 6 is a top plan of the base of the frame with all superimposed structure removed to illustrate the movability of the movable sections of the clamping apparatus upon which is mounted a second pair of welding heads, Fig. 7 is an enlarged transverse section of a portion of the base frame taken on the line 7—7 of Fig. 6, Fig. 8 is a top plan of the carriage for the welding head illustrating the means of propulsion, Fig. 9 is a side elevation of the same showing its three point support engaged with the tracks of various elevations, Fig. 10 is an end elevation illustrating the relation of the welding head carriage to the work.

The invention has been illustrated for welding the longitudinal side rails of an automobile frame, usually averaging about 150 inches in length, but it will be understood that the apparatus may be employed for welding any article having an irregularly contoured seam which represents a component of several different curves. In such illustration, the automobile frame consists of a pair of longitudinal side rails, 1 and 2, which generally diverge from the front to a point adjacent the rear kickups, from which point the rails continue substantially parallel to one another on out to the rear end of the frame, thus giving the rails the effect of outward lateral bows or curvatures. Transverse cross members 5 connect the rails at intervals and outwardly facing channel-shaped sub-rails 6 and 7 are nested within the inwardly facing channels of the main rails throughout most of their length to form them into hollow closed box section, with longitudinal seams 3 and 4 on the top and bottom thereof, with the exception of areas adjacent the third rear cross member 5, where the sub-rails turn inwardly away from the rails to join with this cross member.

The welding machine comprises a base frame mounted upon three longitudinal I beams 8, transversely upon which are secured three deeper I beams 9. Adjacent one side of the base are three more longitudinal I beams 10 secured to the tops of beams 9, which support a heavy base plate 11. A bed block 12 conforming to the shape of one side rail of the frame extends upwardly from the base plate to support the automobile frame upon one side rail with its cross members extending vertically and its other side rail 1 spaced vertically of the base. A vertical rack plate 13 is secured to the outside of the bed 12, and upper and lower vertically spaced guide bars 14 and 15 are secured to the bed and base respectively to conjointly form a horizontal recess or way 90 in and through which the inner end of a horizontal welding head carriage 16 operates to propel the head lengthwise of the automobile frame to follow the curvature of its side rail. This carriage is given a three point support with three supporting wheels or casters A, B and C which ride upon three cam tracks 17, 18 and 19 respectively, fastened to the base plate 11 and extending longitudinally of the frame upon which are traced the dot and dash line roller paths A', B' and C' respectively. These cam tracks are horizontally contoured in the general direction of lateral variations of the automobile side rail when it is in a normal position, and like the guide bars 14 and 15, have varying heights or vertical elevations, to follow the bow and kickups of the rails, whereby a welding head 20 will hold the end of a fusible welding wire 22, constituting an electrode E at substantially right angles to the seam and spaced a uniform distance from the curved seam to accurately follow the contour of the frame throughout its entire length. Reels of welding wire, not shown, are suspended at each side above the machine and the wire therefrom is fed through nozzles 21 at a rate determined by the speed of travel of the welding carriages and the intensity of the arcs.

Each nozzle 21 is arranged at substantially right angles to the seam and the line of movement of the carriage, and inclines downwardly at an angle of approximately 20 degrees to the horizontal so that the arc struck between the end of the electrode E and the seam, cuts or melts away a portion of the exposed edge of the side rail forming a seam. Air jet nozzles 100 are arranged upon opposite sides of the electrode to blow air or a flux ladened gas upon the weld as disclosed in my copending application Serial No. 361,919 filed October 19, 1940.

Carriage propulsion is achieved by a reversible electric motor 23 having an armature pinion 24 meshing with a train of gears 25 terminating with pinion 26 projecting beyond the inner portion of the carriage 16 which moves through the shielded recess 90' and meshes with a rack 31 secured to the rack plate 13. This rack is composed of a series of separate rack bars arranged at various elevations but in a continuous line whereby the drive of the carriage will be constant at the various elevations through which the carriage is moved by riding upon the cam tracks 17, 18 and 19. These rack bars have their teeth normal to the vertical rack plate 13, and the cam tracks are so contoured relatively whereby the carriage and drive pinion 26 are maintained horizontal at all times for proper meshing of the rack and pinion drive, by reason of all three rollers A, B and C simultaneously resting upon the three cam tracks in all positions of the carriage as shown in Fig. 9. This gear engagement is also maintained and the carriage is caused to move or swing horizontally to follow the rail contour, by means of rollers 27 and 28 provided on the top and bottom of the carriage on opposite sides thereof to move through their respective vertical guide grooves 29 and 30 provided in the guide bars 14 and 15 respectively. The top roller 27 is mounted to one side of the axis of pinion 26 and extends upwardly, while the other roller 28 is mounted on the other side of this axis and extends downwardly so that, as the rollers are pushed through their respective guide grooves 29 and 30, they steer the carriage to turn to follow the curves in the seam. It will be noted from Fig. 2 that the top roller 27 is guided by groove 29 while the lower roller 28 travels through groove 30, causing the carriage rollers A, B and C to follow their respective paths A', B' and C' on the cam tracks 17, 18 and 19 respectively and guide the electrode E along curved paths both horizontally and vertically.

If it be desired to weld only one seam of the side rail at the rate of 140 inches per minute, a single welding head may be provided which will traverse the entire length of the frame being welded, but to increase production and rapidly weld both seams 3 and 4 of each side rail simultaneously, a pair of these welding heads and carriages which are designated by the letters W and X are provided for welding the seam on one side of the rail, while a second pair of welding heads Y and Z are provided for welding the seam on the other side of the same rail. Since all of these welding heads are fundamentally the same, the description heretofore given will suffice for all. As will be obvious, the cam tracks 17, 18 and 19, as well as the guide grooves 29 and 30 will vary in contour for each different contoured seam to cause the carriages to accurately follow the curvature of such seam. As shown in Fig. 2, one welding head of each pair is disposed at approximately the center of the frame while the other head of the pair is disposed at one end thereof to simultaneously move toward the right hand end of Fig. 2. The two heads of each pair move simultaneously in the same direction so that when the heads or carriages X and Z reach the right hand end of the frame, to complete their lines of welds, the two heads W and Y will have completed welding their half of the side rails and will terminate their welds at the points where the heads X and Z started their welds. Thus, the apparatus will complete the two longitudinal welds on the side rail simultaneously and in the shortest possible time. After one side rail of the frame has been welded, it is removed from the apparatus and another frame inserted so that the heads then move to the left of Fig. 2 in the same manner to weld the rail of this second frame. The mechanism therefore does not have to be reset or returned to an original position for each frame, and is ready to immediately start work thereon as soon as it is clamped into the apparatus. It will be understood that only one side rail of the frame is welded in this apparatus and that the frame is removed therefrom and is turned on its longitudinal axis to dispose its unwelded rail lowermost to be inserted in a second similar adjacent apparatus in which the stationary and movable sets of cam tracks and guide slots are just the reverse on opposite sides of the apparatus to meet the reversed position of the frame.

The pair of welding heads W and X located on the other side of the apparatus are mounted upon similar cam tracks, 17, 18 and 19 and are propelled thereover in the same manner as the heads Y and Z heretofore described. The cam tracks and rack plate 13 for this pair of heads, instead of being stationary, are mounted upon a laterally movable rectangular carriage 40 so that after the frame has been set down upon the bed clamp 12 and against the upper end of the stationary rack plate 13, the carriage 40 is moved in toward the automobile frame so that the upper end of its rack plate and cover plate 41 firmly clamp the rail in the apparatus. This carriage 40 is mounted upon five rollers 42 which ride upon the tops of the I beams 9 in a rectilinear path under the propulsion of a toggle mechanism 43 operated by a cylinder and plunger mechanism 44. As the plunger moves inwardly, the elbows of the toggle links are broken to withdraw the carriage 40 from its clamping engagement with the automobile frame. This carriage is guided in a rectilinear path by means of horizontal guide rods 45 secured to the innermost I beam 10, operating through suitable bearings 46 provided in the movable frame 40. Kicker pistons and cylinders 90 engage the toggle arms 43 to help start the movement of the toggles from near locked positions.

After the toggle mechanism has been operated to straighten the toggle links and to move the movable rack plate 13 into engagement with the side of the side rails, a series of three clamps 50 conforming to the shape of the side surface of the clamped rails are each lowered into clamping position by means of a pair of vertically movable pivotally connected members 51 having portions 52 offset to avoid the side rail of the frame which is held uppermost. Each member 51 is provided with laterally extending guide eyes 53 operating upon a pair of vertical guide pins 54 mounted upon a vertical frame work 55. A pair of pivotal toggle arms 56 are provided for each vertically movable member 51 for raising and lowering the same, and each pair of toggle links is hung from a pivot 57 carried by a vertically adjustable plate 58 on the framework. A horizontally adjustable wedge 59 is associated with each plate 58 so that by moving the wedge horizontally against a fixed block 81, the adjustable block 58 with its pivot 57 is moved vertically and clamped in the desired adjusted position by bolts as shown, to exert the proper pressure upon the side rails. Two pairs of the toggle links are interconnected by a common actuator bar 60, and a plunger mechanism 61 is connected with the supporting frame and with one of the toggle links for operating both pairs simultaneously.

The third clamp 50 is of similar construction and is operated by means of a separate plunger 62. Thus, the vertically movable clamps 50 are operated in two different sets so that, first one set and then the other may be lowered into clamping position with respect to the automobile frame. As best seen in Fig. 5, certain of these clamping members 51 may be provided with inverted U-shaped brackets 63 adapted to embrace the upper rail of the automobile frame when the clamp is lowered into clamping position so as to brace and support the rail disposed uppermost, whereby the frame is prevented from twisting and distorting while being operated upon by the apparatus.

In this particular exemplification of the invention, it will be noted that the cam tracks 17, 18 and 19 vary in height throughout their length so that the electrode of the welding head will be held normal to the seam while making turns and moving in vertical directions to follow the contour of the rail and this will sometimes occur where the rail or seam varies in elevation at the same point where it curves horizontally, thus causing the rollers A and B of the carriage to make paths A' and B' which intersect, as shown by the dot and dash lines A' and B' in the upper right hand corner of Fig. 2. In this instance the cam track 17 is at a higher elevation than cam track 18 and yet the roller A must move across the track 18 as the carriage is making a turn in a horizontal plane. In order to switch the roller 3 from an elevated cam track to a lower track or vice versa, a switch block 70 is fulcrumed at 71 to move transversely of the two cam tracks 17 and 18 and is operated by a solenoid 72 automatically operated by the welding head carriage as it reaches a certain point in its travel. Thus, when the welding head carriage Z is in its extreme right-hand position to start welding from the right hand end of the rail, this carriage first moves to the left and then the cam grooves 29 and 30 cause the carriage to swing clockwise moving the roller A transversely of its axis to slide across the switch block 70 along the dot and dash lines A' shown in Fig. 2. After the carriage Z has been moved into this arc, it begins to move to the left of Fig. 2 to move the roller A off of the switch block 70 and on to its proper cam track 17. At this point, a switch arm 73 carried by the carriage Z strikes a trip 74 arranged in its path of movement to operate the switch controlling solenoid 72, thereby pulling the switch block out of the two tracks 17 and 18 to permit the unobstructed passage of the trailing roller B over the high switch block. At approximately the same time, a second switch arm 75 engages the trip 74 to cut the welding head of carriage Z out of the circuit, so that it stops welding at the point where the sub-rail 6 leaves the side rail of the frame to join with the cross member 5. When the switch arm 75 is permitted to return to an operative position by sliding off of the trip 74, the welding head of the carriage Z starts its welding operation again at the point where the sub-rail 7 meets the rear end of the frame. When the welding heads X and Z reach the right hand end of the apparatus, their inclined abutment blocks 76 strike the limit switches 77 to cut off the propulsion motors 23 and wire feeding motors carried by the heads. Similar stop limit switches 78 are positioned midway of the apparatus to be operated in either direction by either carriage X or W on the one hand or Y or Z on the other hand. The welding heads W and Y are automatically stopped by limit switches 79 being operated by abutment blocks 80 on the carriages. Thus, each welding head carriage is automatically stopped when it reaches the end of the frame and also when it reaches a point intermediate of the automobile frame. When the head Z returns toward the switch 70, the latter is retracted from the cam tracks 17 and 18 whereby the then forward roller B passes beyond it without obstruction, after which the switch controlling the solenoid 72 is operated to swing the switch plate 70 into the path of roller A so that the same can be slid crosswise from the track 18 to the track 17 in making the turn or curve at the rear end of the frame.

At the diagonally opposite corner of the apparatus where the roller paths A and B cross, the carriage W can be made to track without a switch frog and allowed to tip, to throw its electrode E out of welding position to stop welding where no welding on the frame is necessary. Thus there is provided another form of means for automatically discontinuing the weld at a certain point.

It is to be understood that various changes in the size, shape and arrangement of parts may be resorted to without departing from the spirit of the invention or the scope of the appended claims. Since the apparatus and method can be utilized for cutting metal as well as welding it, the claims are to be construed as either a cutting or welding instrumentality.

I claim:

1. In a welding machine suitable for use in joining relatively long work parts which curve both vertically and horizontally at the same portion, a welding head adapted to progressively move its electrode lengthwise of said parts along the line of intended junction between said parts, and means for simultaneously moving said head both vertically and horizontally as it is moved progressively lengthwise of the work parts.

2. In a welding machine suitable for use in joining work parts which curve both vertically and horizontally at the same portion, a welding head having an electrode to move progressively lengthwise of said parts along the line of intended junction between said parts, guide means for causing said head to move in horizontal planes, and a vertical undulating track for guiding said head in vertical planes as it also moves in horizontal planes.

3. In a welding machine suitable for use in joining relatively long work parts which curve both vertically and horizontally at the same portion, a roller mounted carriage carrying a welding head and adapted to move lengthwise of said part parallel with the line of intended junction between said parts, a plurality of horizontal tracks with various vertical elevations upon which the rollers of said carriage move lengthwise, and transversely of said track to move the welding head vertically and to enable it to be turned in substantially horizontal planes, a guide having a pair of vertically spaced tortuous horizontally curved grooves, a pair of groove engaging elements on said carriage operating in said grooves to turn said carriage in horizontal planes, and means for propelling the carriage lengthwise along said horizontal track.

4. In a welding machine suitable for use in joining relatively long work parts which curve both vertically and horizontally at the same portion, a roller mounted carriage carrying a welding head and adapted to move lengthwise of said part parallel with the line of intended junction between said parts, a plurality of horizontal tracks with various vertical elevations upon which the rollers of said carriage move lengthwise, and transversely of said track to move the welding head vertically and to enable it to be turned in substantially horizontal planes, a guide having a pair of vertically spaced tortuous horizontally curved grooves, a pair of groove engaging elements on said carriage operating in said grooves to turn said carriage in horizontal planes, a gear rack conforming to the vertical and horizontal curvature of the line of junction of the work parts, and a power driven pinion on said carriage engaging said rack to propel the carriage lengthwise along said horizontal track.

5. In a welding machine suitable for use in joining work parts which curve both vertically and horizontally at the same portion, a plurality of horizontal tracks with varying vertical elevations, a carriage carrying a welding head and having a three point roller support adapted to ride upon said horizontal tracks, means for propelling said carriage lengthwise of said tracks, and means for turning said carriage in horizontal planes and moving said rollers transversely of said tracks.

6. In a welding machine suitable for use in joining relatively long work parts which have an irregular line of intended junction which varies horizontally and vertically from a theoretical straight line drawn from one end of the part to the other end thereof, a roller carriage, a welding head on the carriage having an electrode adapted to traverse a line parallel to said irregular line of junction, tracks with various vertical elevations upon which the rollers of said carriage move lengthwise, crosswise and vertically, means for propelling said carriage lengthwise along said tracks, and means for moving the carriage crosswise of said tracks.

7. In a welding machine suitable for use in joining relatively long work parts which have an irregular line of intended junction which varies horizontally and vertically from a theoretical straight line drawn from one end of the part to the other end thereof, a roller carriage, a welding head on the carriage having an electrode adapted to traverse a line parallel to said irregular line of junction, tracks with various vertical elevations upon which the rollers of said carriage move lengthwise, crosswise and vertically, a guide having a pair of vertically spaced tortuous horizontally curved grooves, and a pair of groove engaging elements on said carriage operating in said grooves to cause horizontal turning of the carriage.

8. In a welding machine suitable for use in joining relatively long work parts which curve both vertically and horizontally at the same portion, a roller mounted carriage carrying a welding head adapted to be moved lengthwise of said part parallel with the line of intended junction between said parts, a plurality of horizontal parts with various vertical elevations upon which the rollers of said carriage move lengthwise and transversely to move the welding head vertically and to enable it to be turned in substantial horizontal planes, a guide having a pair of vertically spaced tortuous horizontally curved grooves, a pair of groove engaging elements on said carriage operating in said grooves to turn said carriage in horizontal planes, a switching block positioned in said tracks where the paths of said rollers intersect, said switching block corresponding in height to the highest track, and means for swinging said switching block relative to the track to allow passage of the rollers over their respective tracks.

9. In a welding machine for making continuous welded seams curving both horizontally and vertically, means for clamping work in a fixed position, a welding head, means for moving said welding head lengthwise along said seam, and means for moving said head in a path which is a component of its horizontal and vertical movements.

10. In a welding machine, means for clamping work in fixed position, a welding head, means for moving said welding head lengthwise of the work, means for moving the head horizontally, means for moving the head vertically and on a component of all three directions simultaneously.

WILLIAM E. SMITH.